United States Patent
Gangl

(10) Patent No.: US 10,041,753 B2
(45) Date of Patent: Aug. 7, 2018

(54) MULTIPLE FLANGE CRUSH WASHER

(71) Applicant: J&K IP Assets, LLC, Cheyenne, WY (US)

(72) Inventor: Matthew Gangl, Falcon Heights, MN (US)

( * ) Notice: Subject to any disclaimer, the term of this patent is extended or adjusted under 35 U.S.C. 154(b) by 0 days.

(21) Appl. No.: 15/479,869

(22) Filed: Apr. 5, 2017

(65) Prior Publication Data

US 2017/0292806 A1  Oct. 12, 2017

Related U.S. Application Data

(60) Provisional application No. 62/318,820, filed on Apr. 6, 2016.

(51) Int. Cl.
| | |
|---|---|
| *F41A 21/00* | (2006.01) |
| *F41A 21/32* | (2006.01) |
| *F16B 43/00* | (2006.01) |
| *F16B 39/24* | (2006.01) |

(52) U.S. Cl.
CPC ............ *F41A 21/325* (2013.01); *F16B 39/24* (2013.01); *F16B 43/00* (2013.01)

(58) Field of Classification Search
CPC ......... F41A 21/325; F16B 39/24; F16B 43/00
USPC .......................................................... 42/76
See application file for complete search history.

(56) References Cited

U.S. PATENT DOCUMENTS

| | | | | |
|---|---|---|---|---|
| 2,815,059 A | * | 12/1957 | Fiddler ................... | F16B 39/24 411/134 |
| 3,627,334 A | * | 12/1971 | Reddy ................... | F16B 43/001 277/637 |
| 4,138,198 A | * | 2/1979 | Brown ................... | F16B 39/24 29/525.02 |
| 5,306,108 A | * | 4/1994 | Goldman .............. | F16B 43/001 411/369 |

(Continued)

OTHER PUBLICATIONS

Product listing from newfrontierarmory.com "1/2"(.50" ID) Crush Washer", SKU: MD-CW-5; screenshot was made Nov. 29, 2017.*

(Continued)

*Primary Examiner* — Samir Abdosh
(74) *Attorney, Agent, or Firm* — Bennet K. Langlotz; Langlotz Patent & Trademark Works, Inc.

(57) ABSTRACT

One aspect of the present disclosure is directed to a crush washer for a firearm that comprises a ring of material about a center axis having an inner surface towards the center axis and an outer surface away from the center axis, and at least one groove in the inner surface or outer surface. The groove forms: a first flange having an inner surface and an outer surface with a thickness therebetween; a second flange having an inner surface and an outer surface with a thickness therebetween; and a bridge connecting the first flange and the second flange, the bridge having an inner surface and an outer surface with a thickness therebetween. In an undeformed state, the inner surface of the first flange is adjacent to, but spaced apart from, the inner surface of the second flange. In a deformed state, the inner surface of the first (Continued)

flange is closer to the inner surface of the second flange compared to the undeformed state. The thickness of the bridge is less than the thickness of the first flange and less than the thickness of the second flange.

20 Claims, 4 Drawing Sheets

(56) References Cited

U.S. PATENT DOCUMENTS 9,175,772 B2 * 11/2015 MacHesky ............. F16J 15/024
2010/0225110 A1 * 9/2010 Christie ................ F16J 15/122
                                                                                      285/351

OTHER PUBLICATIONS

Patrick R, "Review: Armageddon Tactical CompTek Type 1 Muzzle Brake," http://www.thefirearmblog.com/blog/2016/04/26/review-armageddon-tactical-comptek-type-1-muzzle-brake/, Posted Apr. 26, 2016, Accessed Dec. 18, 2017.
Armageddon Tactical, "Crush Washer for 1/2" Barrel Threads Pack of 5—4140 Steel/Black Oxide Finish," https://armageddontactical.com/products/crush-washer-for-1-2-barrel-threads-pack-of-5-17-4-stainless-steel-machined-finish, (c) 2017, Accessed Dec. 18, 2017.

* cited by examiner

MULTIPLE FLANGE CRUSH WASHER

FIELD OF THE INVENTION

The present invention relates to crush washers, and more particularly to crush washers for a firearm designed for low profile applications.

BACKGROUND OF THE INVENTION

It is often desired to add muzzle treatments to firearms, for example compensators, silencers, and the like to the barrel. In these situations, crush washers are commonly used to secure these muzzle treatments, which are often connected through a threaded engagement. The crush washer is placed between two parts that are threaded together and resists the threading of the components together, but deforms under pressure to give a jamming force on the mating components.

The common industry crush washer available today for firearms manufacturing consists of a conical flange or ring of material. This flange twists about itself under load, plastically deforming to provide the jamming force.

Often the common industry crush washers available provide too little crushing length (number of rotations until full crush) which does not allow for timing of components. They also often jam onto mating threads in the process of deformation making their removal difficult. These problems are caused by the challenge of small clearances. In this case of muzzle devices and barrels, the outer diameter of the crush washer must remain close to the diameter of the barrel for aesthetic reasons. Meanwhile the inner diameter of the crush washer must be larger than the major diameter of the mating threads. This only allows for a small area for the crush washer.

Thus, a need exists to have a crush washer that provides adequate crush length in situations where total maximum diameter allowable is very close to the major diameter of the shaft that crush washer is resting on.

SUMMARY OF THE DISCLOSURE

One aspect of the present disclosure is directed to a crush washer for a firearm that comprises a ring of material about a center axis having an inner surface towards the center axis and an outer surface away from the center axis, and at least one groove in the inner surface or outer surface. The groove forms: a first flange having an inner surface and an outer surface with a thickness therebetween; a second flange having an inner surface and an outer surface with a thickness therebetween; and a bridge connecting the first flange and the second flange, the bridge having an inner surface and an outer surface with a thickness therebetween. In an undeformed state, the inner surface of the first flange is adjacent to, but spaced apart from, the inner surface of the second flange. In a deformed state, the inner surface of the first flange is closer to the inner surface of the second flange compared to the undeformed state. The thickness of the bridge is less than the thickness of the first flange and less than the thickness of the second flange.

In another aspect, the present disclosure provides a firearm comprising: a barrel having a muzzle end and a rear end; a muzzle treatment attached to the muzzle end of the barrel; and a crush washer disposed around the barrel and adjacent to the muzzle treatment, wherein the crush washer is adapted to deform under pressure and provide a jamming force between the muzzle treatment and the barrel, and wherein the crush washer comprises a groove. The grove forms a first flange having an inner surface and an outer surface with a thickness therebetween; a second flange having an inner surface and an outer surface with a thickness therebetween; and a bridge connecting the first flange and the second flange, the bridge having an inner surface and an outer surface with a thickness therebetween. The thickness of the bridge is less than the thickness of the first flange and less than the thickness of the second flange.

In another aspect, the present disclosure provides a crush washer comprising a groove forming: a first flange having an inner surface and an outer surface with a thickness therebetween; a second flange having an inner surface and an outer surface with a thickness therebetween; and a bridge connecting the first flange and the second flange, the bridge having an inner surface and an outer surface with a thickness therebetween. In an undeformed state, the inner surface of the first flange is adjacent to, but spaced apart from, the inner surface of the second flange. In a deformed state, the inner surface of the first flange is closer to the inner surface of the second flange compared to the undeformed state. The thickness of the bridge is less than the thickness of the first flange and less than the thickness of the second flange. The thickness of the first flange and the thickness of the second flange are substantially the same in the undeformed state and the deformed state.

The aspects of the disclosure provide a crush washer that provides adequate crush length in situations where total maximum diameter allowable is very close to the major diameter of the shaft that crush washer is resting on. For example, by using multiple flanges connected by bridge of plastically deforming material, the flanges compress together by bending the plastic bridges of material to form a solid body which retains diameters close to or slightly larger than its un-deformed state.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

The present disclosure may be understood more readily by reference to the following detailed description. It is to be understood that the embodiments herein are not limited to the specific devices, methods, conditions or parameters described herein, and that the terminology used herein is for the purpose of describing particular embodiments by way of example only and is not intended to be limiting of the claimed invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification containing the appended claims, the singular forms "a," "an," and "the" include the plural, and reference to a numerical value includes at least that particular value, unless the context clearly dictates otherwise. Ranges may be expressed herein as from "about" or "approximately" one value and/or to "about" or "approximately" another particular value.

Figure 1:
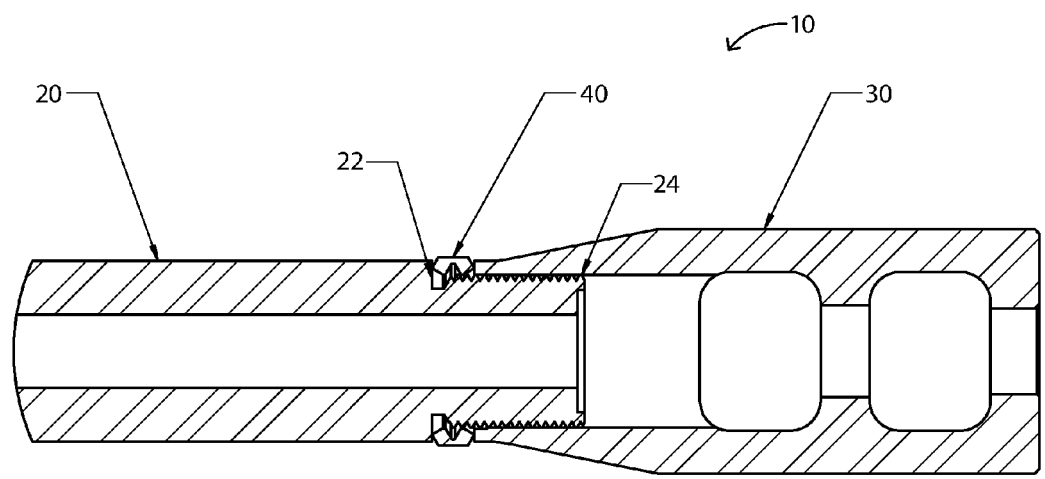
FIG. 1 illustrates a cross section of a firearm assembly including a barrel, a crush washer, and a muzzle treatment according to one embodiment of the disclosure.
Figure 2:
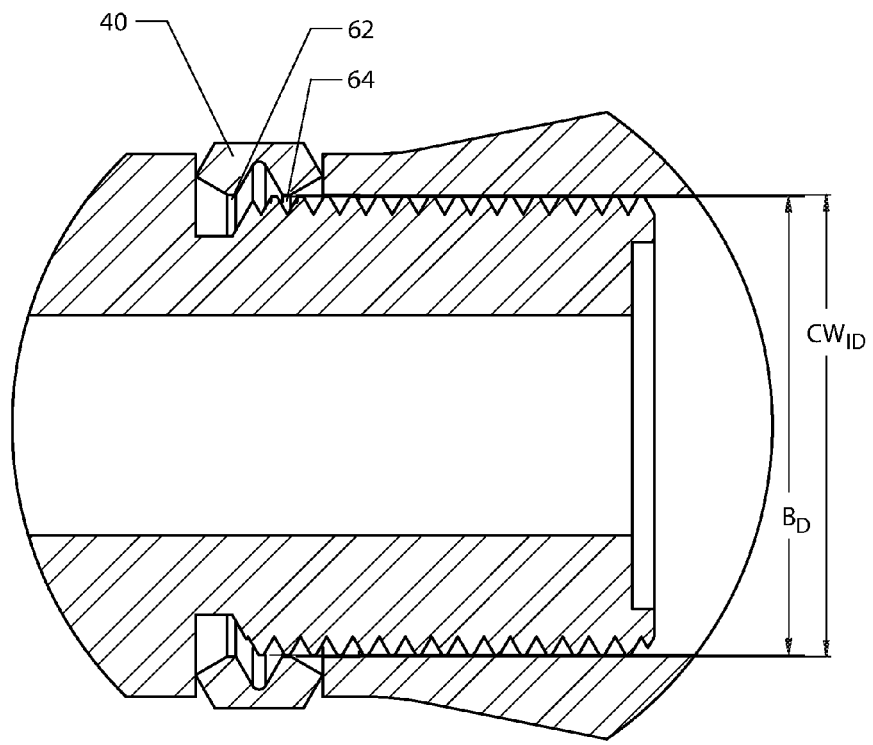
FIG. 2 illustrates a close up of the cross section of FIG. 1 about the crush washer.

Referring now to FIGS. 1-2, there is illustrated a firearm assembly 10 that includes a barrel 20 having a barrel shoulder 22 and a threaded muzzle end 24. The threaded muzzle end 24 can have a major diameter $B_D$ measured as the longest diameter in the threaded region. A crush washer 40 is disposed adjacent the barrel shoulder 22 and at least partially over the threads on the barrel in an undeformed state. A muzzle device 30 is adjacent the crush washer 40, opposite the barrel shoulder 22.

As particularly illustrated in FIG. 2, the crush washer 40 can have an inner diameter $CW_{ID}$ and an outer diameter $CW_{OD}$. Further, the threaded region of the barrel can have a major outer diameter, measured as the longest diameter $B_D$ about the threaded region. The crush washer can have a close fit to the threaded region of the muzzle end of the barrel. In other words, the inner diameter of the crush washer can be slightly greater than the outer diameter of the barrel about the threaded region of the muzzle end. In particular embodiments, the inner diameter of the crush washer can be no more than 10% greater, 5% greater, 1% greater, or even 0.5% greater than the outer diameter of the barrel about the threaded region of the muzzle end.

Figure 3:
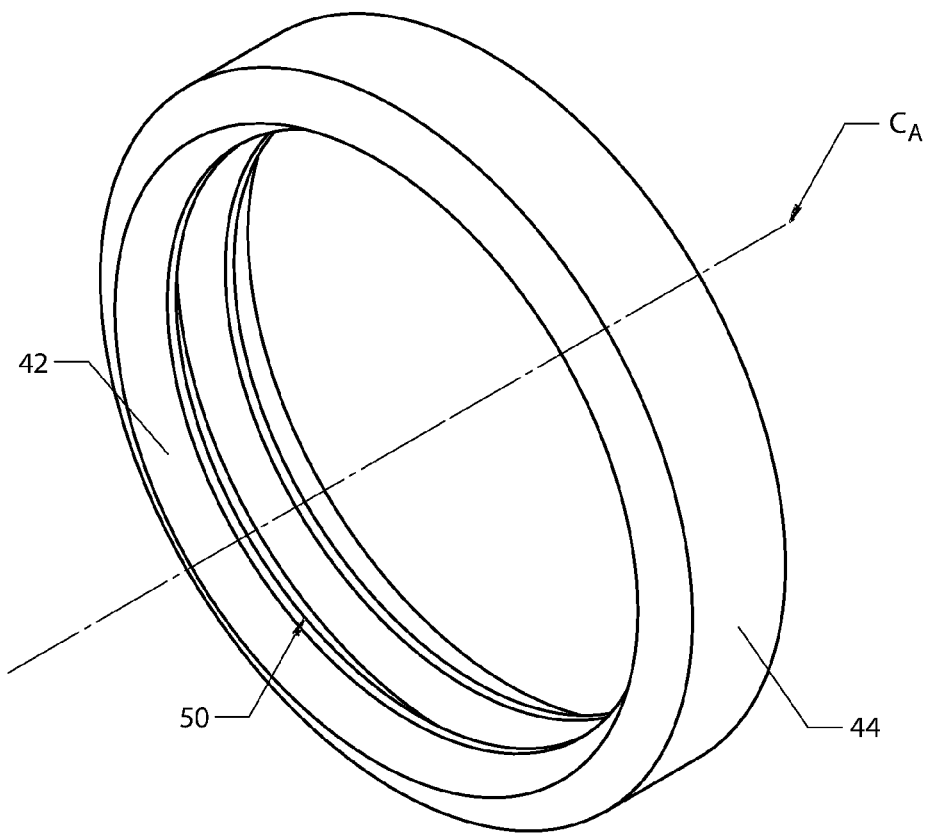
FIG. 3 illustrates a perspective view of a crush washer according to one embodiment.

Referring now to FIG. 3, an isometric view of the crush washer is shown. The crush washer can include a ring of material disposed about a center axis $C_A$. The ring of material can have an inner surface 42 toward the center axis and an outer surface 44 away from the center axis. A groove 50 can be disposed on the inner surface 42.

Figure 4:
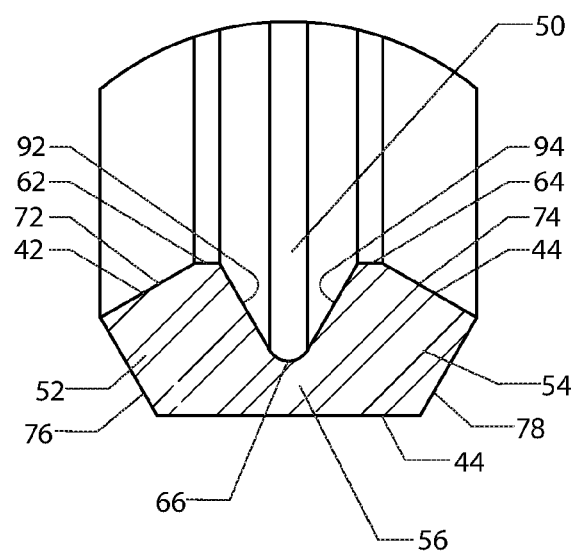
FIG. 4 illustrates a cross section of a crush washer according to one embodiment.
Figures 5, 6, 7:
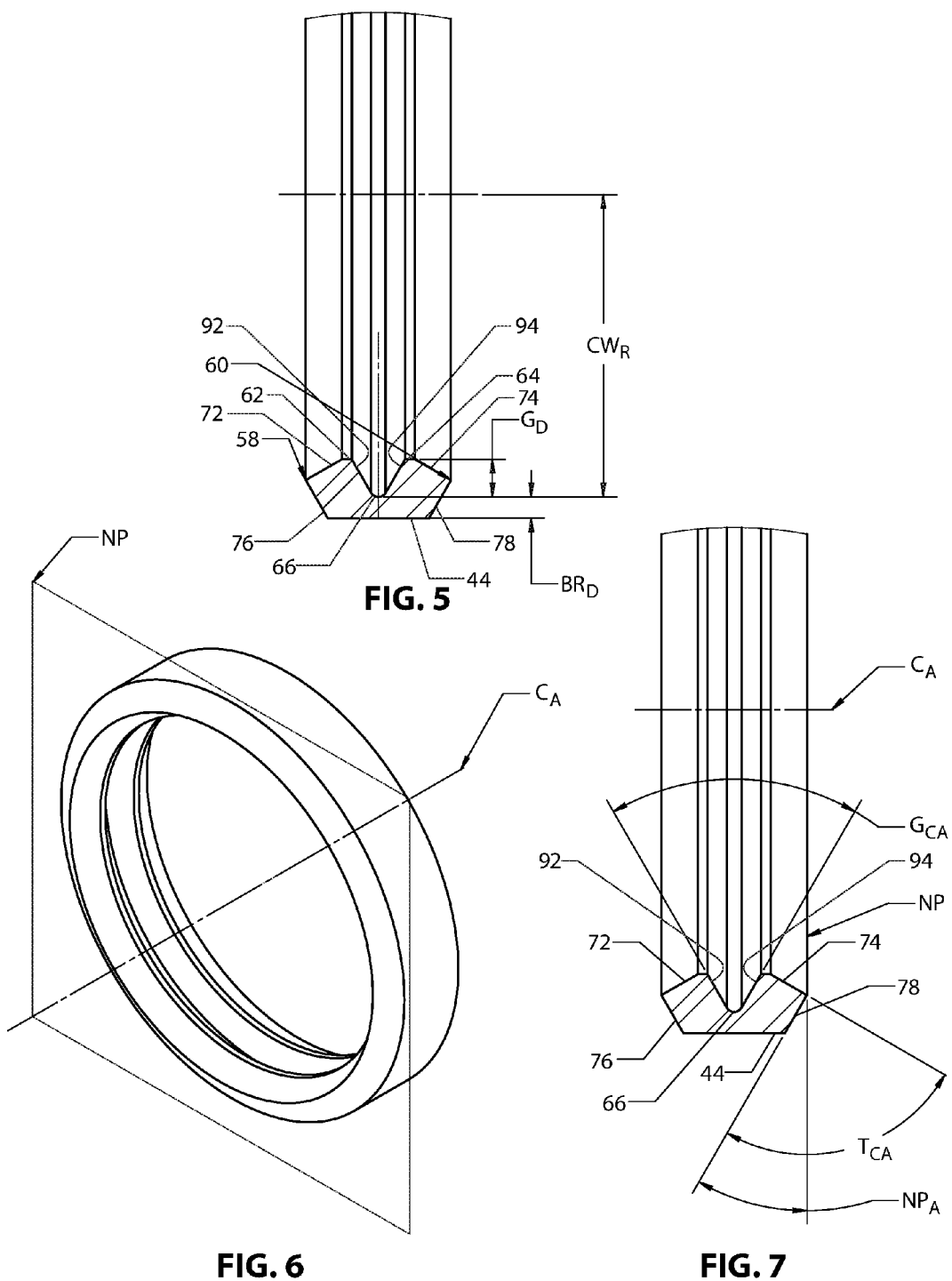
FIG. 5 illustrates a cross section of a crush washer with the central axis according to one embodiment.
FIG. 6 illustrates a perspective view of the crush washer of FIG. 3 showing the normal plane.
FIG. 7 illustrates a cross section of a crush washer according to one embodiment defining the plurality of angles formed by the crush washer profile.

FIG. 4 illustrates a perspective cross section view of the crush washer. The groove 50 divides the crush washer into a first flange 52 and a second flange 54 with a bridge 56 disposed between and connecting the first flange 52 and the second flange 54. The groove 50 can have a groove depth $G_D$, measured as the lateral distance between the top surface and bottom surface of the groove.

As illustrated, the crush washer can include one groove. In other embodiments, the crush washer can include a plurality of grooves. Further, as shown, the groove can be disposed on the inner surface of the crush washer. In other embodiments, the groove can be disposed on the outer surface of the crush washer.

The crush washer further includes a first contact point 58 disposed on the first flange, and a second contact point 60 disposed on the second flange. The respective contact points are adapted to contact the barrel shoulder and muzzle treatment respectively.

The first flange 52 can include a first chamfered surface 62 (also referred to as a centering surface) adjacent the groove and the second flange 54 can include a second chamfered surface 64 (also referred to as a centering surface) adjacent the groove. The first and second chamfered surfaces can be generally parallel to the outer surface 44 of the crush washer in an undeformed state. Further, the groove can have a lower surface 66 disposed on the lowermost portion of the groove and defining the top surface of the bridge region. In certain embodiments, the lower surface 66 of the groove can be generally parallel to the outer surface 44 of the crush washer in an undeformed state. In other embodiments, the lower surface 66 of the groove can have a parabolic profile.

Referring now to FIGS. 4-7, the inner flange surfaces 72, 74 and the outer flange surfaces 76, 78 can be generally perpendicular to each other. In particular embodiments, the inner flange surface can have an angle to the outer flange surface in a range of from about 30 degrees to 150 degrees, 45 degrees to 135 degrees, 60 degrees to 120 degrees, 75 degrees to 105 degrees, or even 80 degrees to 100 degrees.

The crush washer can have a particular angle of groove crush $GC_A$, measured as the angle between the groove flange surface 92 of the first flange and the groove flange surface 94 of the second flange. In particular embodiments, the crush washer can have an angle of groove crush $GC_A$ in a range of from about 10 degrees to 170 degrees, 20 degrees to 160 degrees, 30 degrees to 150 degrees, 45 degrees to 135 degrees, 60 degrees to 120 degrees, 75 degrees to 105 degrees, or even 80 degrees to 100 degrees.

Further, the crush washer can have a total angle of crush $TC_A$, measured as the sum of the angles between the groove flange surface 92 of the first flange and the groove flange surface 94 of the second flange for each groove included in the crush washer. In the example illustrated, there is only one groove, and as such the angle of groove crush is equivalent to the total angle of crush. However, it is to be understood that the present disclosure contemplates the potential desirability of having a plurality of grooves. In particular embodiments, the crush washer can have a total angle of crush $TC_A$ in a range of from about 10 degrees to 170 degrees, 20 degrees to 160 degrees, 30 degrees to 150 degrees, 45 degrees to 135 degrees, 60 degrees to 120 degrees, 75 degrees to 105 degrees, or even 80 degrees to 100 degrees.

In further embodiments, the outer surfaces 76, 78 of the respective flanges can have an angle to the normal plane $NP_A$ of the crush washer that is generally half the angle of total crush $TC_A$.

Figure 8:
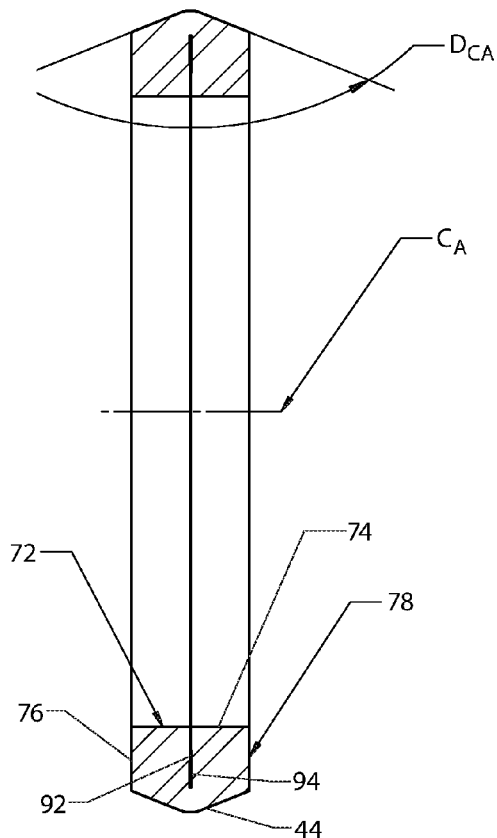
FIG. 8 illustrates a cross section of a crush washer in the deformed state according to one embodiment.
Figure 9:
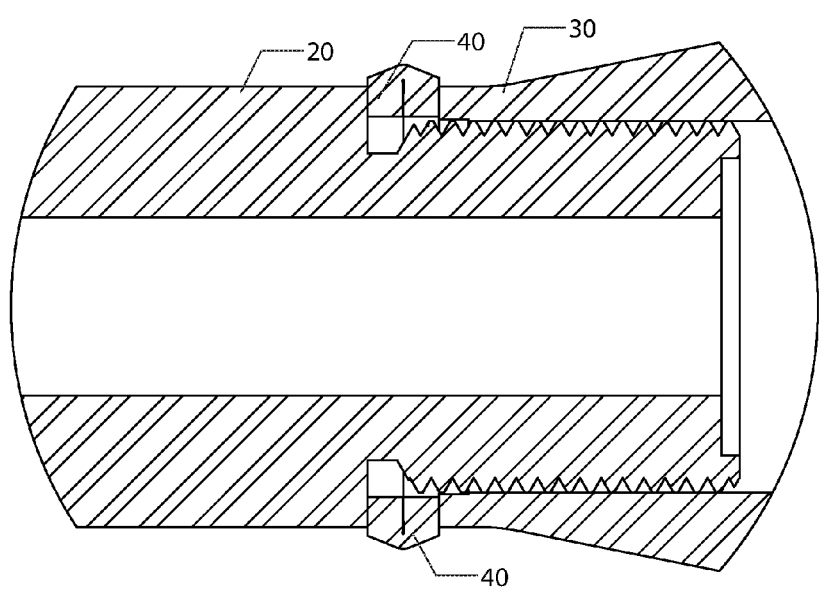
FIG. 9 illustrates a cross section of a firearm assembly with the crush washer in the deformed state according to one embodiment.

Referring now to FIGS. 8 to 9, the firearm assembly and the crush washer is illustrated in the deformed state, after tightening of the muzzle treatment onto the barrel of the firearm. For example, as the muzzle device is tightened on the threaded connection with the barrel, the muzzle device begins to apply force to the crush washer, transforming the crush washer into a deformed thereby providing a jamming force to securely fasten the muzzle device to the barrel.

As illustrated, in the deformed state, the groove is deformed and collapses such that the groove surfaces of the flanges 51, 53 directly contact each other. In particular embodiments, the outer surfaces 76, 78 of the flanges in the deformed state can be generally parallel to the normal plane NP of the crush washer. Further, the inner surfaces of the flanges 72, 74 in the deformed state can be generally perpendicular to the outer surface 76, 78 of the flanges. In other embodiments, the groove surfaces of the flanges 51, 53 can maintain a spaced apart relationship in a deformed state, but closer to each other than in the undeformed state.

As further illustrated, in the deformed state, the outer surface 44 of the crush washer can be generally inverted from the undeformed state. For example, in the undeformed state, the outer surface 44 of the crush washer is generally flat and parallel to the center axis $C_A$. In the deformed state, the outer surface 44 of the crush washer bends and forms a deformed crush angle $DC_A$ of the outer surface. In particular embodiments, the deformed crush angle $DC_A$ can be in a range of from about 10 degrees to 170 degrees, 20 degrees to 160 degrees, 30 degrees to 150 degrees, 45 degrees to 135 degrees, 60 degrees to 120 degrees, 75 degrees to 105 degrees, or even 80 degrees to 100 degrees.

The present disclosure represents a departure from the state of the art. In particular embodiments, the presence of and design of the profile of the crush washer can provide improved force to hold together the two connected components. For example, the crush washer can provide increased crush length in situations where total maximum diameter allowable is very close to the major diameter of the barrel that crush washer is resting on.

Equivalent elements can be substituted for the ones set forth above such that they perform in substantially the same manner in substantially the same way for achieving substantially the same result. It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described is merely exemplary and an explanatory embodiment thereof.

I claim:

1. A crush washer for a firearm, the crush washer comprising a ring of material about a center axis having an inner surface towards the center axis and an outer surface away from the center axis, and at least one groove in the inner surface or outer surface forming:
    a first flange having an inner surface and an outer surface with a thickness therebetween;
    a second flange having an inner surface and an outer surface with a thickness therebetween; and
    a bridge connecting the first flange and the second flange, the bridge having an inner surface and an outer surface with a thickness therebetween;
    wherein in an undeformed state, the inner surface of the first flange is adjacent to, but spaced apart from, the inner surface of the second flange;
    wherein in a deformed state, the inner surface of the first flange is closer to the inner surface of the second flange compared to the undeformed state; and
    wherein the thickness of the bridge is less than the thickness of the first flange and less than the thickness of the second flange.

2. The crush washer of claim 1, wherein the groove is disposed on the inner surface of the crush washer.

3. The crush washer of claim 1, wherein the crush washer comprises one groove.

4. The crush washer of claim 1, wherein the crush washer comprises a plurality of grooves.

5. The crush washer of claim 1, wherein the crush washer comprises a first chamfered surface adjacent the groove and the second flange can include a second chamfered surface adjacent the groove, and wherein the first and second chamfered surfaces are generally parallel to a central axis of the crush washer in an undeformed state.

6. The crush washer of claim 1, wherein the groove comprises a lower surface disposed on the lowermost portion of the groove and defining a top surface of the bridge region, wherein the lower surface of the groove can be generally parallel to a central axis of the crush washer in an undeformed state.

7. The crush washer of claim 1, wherein the groove flange surface of the first flange has an angle to the groove flange surface of the second flange in a range of from 30 degrees to 150 degrees, 45 degrees to 135 degrees, 60 degrees to 120 degrees, 75 degrees to 105 degrees, or even 80 degrees to 100 degrees.

8. A firearm comprising:
    a barrel having a muzzle end and a rear end;
    a muzzle treatment attached to the muzzle end of the barrel;
    a crush washer disposed around the barrel and adjacent to the muzzle treatment, wherein the crush washer is adapted to deform under pressure and provide a jamming force between the muzzle treatment and the barrel, and wherein the crush washer comprises a groove forming:
        a first flange having an inner surface and an outer surface with a thickness therebetween;
        a second flange having an inner surface and an outer surface with a thickness therebetween; and
        a bridge connecting the first flange and the second flange, the bridge having an inner surface and an outer surface with a thickness therebetween;
        wherein the thickness of the bridge is less than the thickness of the first flange and less than the thickness of the second flange.

9. The firearm of claim 8, wherein the crush washer has a close fit to the outer diameter of the barrel.

10. The firearm of claim 8, wherein the crush washer comprises one groove.

11. The firearm of claim 8, wherein the crush washer comprises a plurality of grooves.

12. The firearm of claim 8, wherein the crush washer comprises a first chamfered surface adjacent the groove and the second flange can include a second chamfered surface adjacent the groove, and wherein the first and second chamfered surfaces are generally parallel to a central axis of the crush washer in an undeformed state.

13. The firearm of claim 8, wherein the groove comprises a lower surface disposed on the lowermost portion of the groove and defining a top surface of the bridge region, wherein the lower surface of the groove can be generally parallel to a central axis of the crush washer in an undeformed state.

14. The firearm of claim 8, wherein the groove flange surface of the first flange has an angle to the groove flange surface of the second flange in a range of from 30 degrees to 150 degrees, 45 degrees to 135 degrees, 60 degrees to 120 degrees, 75 degrees to 105 degrees, or even 80 degrees to 100 degrees.

15. A crush washer comprising a groove forming:
    a first flange having an inner surface and an outer surface with a thickness therebetween;
    a second flange having an inner surface and an outer surface with a thickness therebetween; and
    a bridge connecting the first flange and the second flange, the bridge having an inner surface and an outer surface with a thickness therebetween;
    wherein in an undeformed state, the inner surface of the first flange is adjacent to, but spaced apart from, the inner surface of the second flange;
    wherein in a deformed state, the inner surface of the first flange is closer to the inner surface of the second flange compared to the undeformed state; and wherein the thickness of the bridge is less than the thickness of the first flange and less than the thickness of the second flange; and wherein the thickness of the first flange and the thickness of the second flange are substantially the same in the undeformed state and the deformed state.

16. The crush washer of claim 15, wherein the crush washer comprises one groove.

17. The crush washer of claim 15, wherein the crush washer comprises a plurality of grooves.

18. The crush washer of claim 15, wherein the crush washer comprises a first chamfered surface adjacent the groove and the second flange can include a second chamfered surface adjacent the groove, and wherein the first and second chamfered surfaces are generally parallel to a central axis of the crush washer in an undeformed state.

19. The crush washer of claim 15, wherein the groove comprises a lower surface disposed on the lowermost portion of the groove and defining a top surface of the bridge region, wherein the lower surface of the groove can be generally parallel to a central axis of the crush washer in an undeformed state.

20. The crush washer of claim 15, wherein the groove flange surface of the first flange has an angle to the groove flange surface of the second flange in a range of from 30 degrees to 150 degrees, 45 degrees to 135 degrees, 60 degrees to 120 degrees, 75 degrees to 105 degrees, or even 80 degrees to 100 degrees.

* * * * *